United States Patent [19]

Maucher

[11] 4,143,748
[45] Mar. 13, 1979

[54] DISENGAGING BEARING FOR CLUTCHES OF MOTOR VEHICLES

[75] Inventor: Paul Maucher, Sasbach, Fed. Rep. of Germany

[73] Assignee: LuK Lamellen und Kupplungsbau GmbH, Buhl, Fed. Rep. of Germany

[21] Appl. No.: 708,296

[22] Filed: Jul. 26, 1976

[30] Foreign Application Priority Data

Jul. 26, 1975 [DE] Fed. Rep. of Germany ....... 2535560

[51] Int. Cl.² ............................................. F16D 23/14
[52] U.S. Cl. ..................................... 192/98; 308/233
[58] Field of Search ............... 192/98, 110 B; 308/233

[56] References Cited

U.S. PATENT DOCUMENTS

| 3,815,715 | 6/1974 | Maucher ................................ 192/98 |
| 3,882,979 | 5/1975 | Limbacher ............................. 192/98 |

FOREIGN PATENT DOCUMENTS

| 1944839 | 1/1971 | Fed. Rep. of Germany ............. 192/98 |
| 2413856 | 10/1974 | Fed. Rep. of Germany ............. 192/98 |
| 1390092 | 4/1975 | United Kingdom ....................... 192/98 |
| 1392399 | 4/1975 | United Kingdom ....................... 192/98 |

Primary Examiner—Benjamin W. Wyche
Attorney, Agent, or Firm—Herbert L. Lerner

[57] ABSTRACT

Disengaging device for a clutch includes support means, an anti-friction bearing having one bearing race predisposed to act upon and co-rotate with disengaging means of the clutch and another bearing race predisposed not to co-rotate with the clutch disengaging means and being actable upon by the support means through a contact surface so as to effect a disengaging movement, and means providing a resistance to displacement in radial direction effective between the support means and the antifriction bearing, the means providing a resistance to displacement comprising at least one bracing or holding member elastic in axial direction, the bracing member being clamped, on one hand, by bracing profile means formed in one of the non-rotating bearing race and the support means so as to be braced directionally neutral in axial direction, the bracing member effectively engaging, on the other hand, the other of the non-rotating bearing race and the support means so as to hold the non-rotating bearing race and the support means in a respective relative radial position.

16 Claims, 5 Drawing Figures

U.S. Patent    Mar. 13, 1979    4,143,748
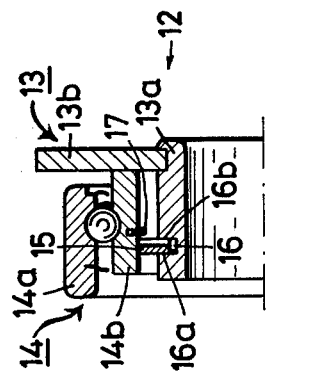
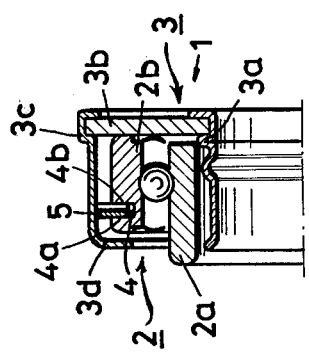
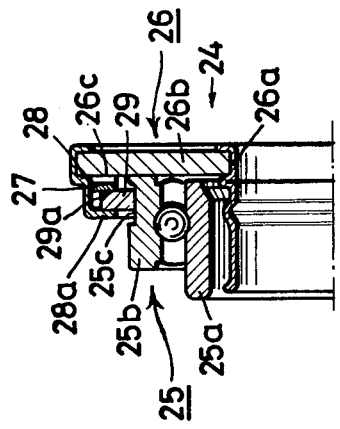
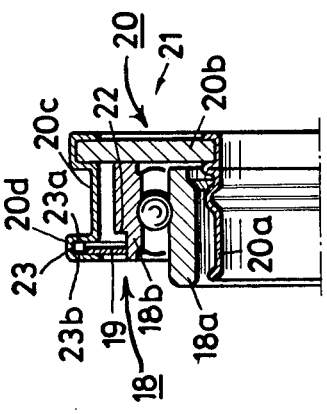

DISENGAGING BEARING FOR CLUTCHES OF MOTOR VEHICLES

The invention relates to a disengaging device or shifter, particularly for clutches of motor vehicles, wherein a support for an antifriction bearing is provided, one race of the bearing being predisposed for acting on the clutch and for co-rotating with the disengaging means of the clutch, and the other race which is not predisposed to co-rotate with the clutch disengaging means, is actable upon by the support through a contact surface, for executing the disengaging movement, a resistance to displacement effective between the support and the antifriction bearing being supposed to ensure that, after centering thereof, the bearing is held on the axis of rotation of the clutch.

It has been found, however, that disengaging devices or shifters of this general type, such as have become known from German Published Prosecuted Application DAS No. 1,600,080, for example, require very narrow manufacturing tolerances to achieve axial bracing of the bearing against the support and requires a correspondingly great expense.

It is accordingly an object of the invention to provide a disengaging device which eliminates these disadvantages and which, more specifically, are distinguished by low manufacturing costs and relatively simple construction.

According to the invention, this is achieved by the provision that, in a disengaging device of the type described at the outset hereof, the resistance to displacement is effected by a bracing or holding member which is resilient in axial direction and which itself is braced, on the one hand, through bracing regions or bracing profiles provided in one of the two structural parts, the non-rotating race or the support without generating an axial bracing force between the bearing and the support i.e. is braced neutrally as to direction in axial direction, this bracing member, on the other hand, effectively engaging the other of the structural parts, and the bearing can be held in the respective position in which it finds itself after being centered on the axis of rotation of the clutch.

The bracing member can be formed of such bracing means as a wave-shaped or corrugated washer or a cup or plate spring, for example. However, one can also use such bracing means that are braced in axial direction without exertion of an axial compressive force between the bearing and the support i.e., neutral with respect to the axis, and which are, in addition, also resilient in radial direction and rest, braced, against the respective other of the structural parts, so that resistance against axial displacement can become effective. The bracing member may also be formed, however, of at least one part which is elastic in axial direction and at least one part which is elastic in radial direction. If more than one means braced in axial direction e.g. corrugated washers or cup or plate springs, is used, they may be braced against one another in opposite placement directions over their radially outer or inner regions through the bracing regions, and effectively engage the other of the structural parts with their radially inner or outer regions. The disposition thereof can be such that the bracing means can be displaced both in radial direction relative to the bearing as well as relative to the support. In by far the most cases, however, it is advantageous in accordance with the invention that the bracing element is secured in radial direction formlockingly at one of the two structural parts, the non-rotating race or support, and a relative movement is possible with respect to the other of the two structural parts in radial direction between the bracing member and the bracing regions. For this purpose, the bracing member may enclose with one of the diametric regions thereof peripheral regions of the respective other of the structural parts i.e. of that one of the structural parts which is not provided with bracing profiles, or alternately, the bracing member may be enclosed by peripheral regions of the other of the structural parts.

In accordance with another feature of the invention, the non-rotating bearing race contains the profile means clamping the bracing member neutrally as to direction, the profile means, such as a groove, having a radial depth affording radial displacement of the antifriction bearing relative to the bracing member and the support means, the bracing member with regions projecting in radial direction from the profile means being in engagement with regions of the support means.

In accordance with a further feature of the invention, the non-rotating bearing race is the outer bearing race of the antifriction bearing, and the radial depth of the profile means, such as a groove, is greater than the radially inward extension of the clamping member, the clamping member having a radially outwardly extending portion disposed beyond the outer diameter of the outer bearing race and radially enclosed by an overlapping sleeve.

In accordance with an added feature of the invention, the non-rotating bearing race is the inner bearing race of the antifriction bearing, and the radial depth of the profile means, such as a groove, is greater than the radially outward extension of the clamping member, a region of the clamping member directed radially inwardly out of the profile means being in engagement with axially extending regions of the support means.

In accordance with an additional feature of the invention, the antifriction bearing together with the bracing member is axially displaceable relative to the support means, and stop means extending in radial direction are provided on the support means for limiting axial displacement of the bracing member.

In accordance with yet another feature of the invention, the support means contain the profile means clamping the bracing member neutrally as to direction, the profile means, such as a groove, having a radial depth affording radial displacement of the bracing member together with the antifriction bearing, the bracing member having regions thereof projecting in radial direction out of the profile means, such as a groove, and into engagement with the non-rotating bearing race.

In accordance with yet a further feature of the invention, the support means have a region thereof underlying the non-rotating bearing race in axial direction and radially spaced therefrom, the profile means being contained in the region of the support means.

In accordance with an alternate feature of the invention, the support means include an enclosure portion overlying the outer race of the antifriction bearing and extending in axial direction and radially spaced therefrom, the profile means being contained in the enclosure portion of the support means.

In accordance with a concomitant feature of the invention, the antifriction bearing is axially displaceable reltaive to the support means and the bracing member, and stop means are included extending in radial direction and effective between the non-rotating bearing race and the bracing member for limiting axial displacement of the antifriction bearing.

Other features which are considered as characteristic for the invention are set forth in the appended claims.

Although the invention is illustrated and described herein as embodied in a disengaging device, particularly for clutches of motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 to 5 are half-sectional views, respectively, of different embodiments of the disengaging device of the invention.

Referring now to the drawing and first, particularly, to FIG. 1 thereof, there is shown a so-called centrally guided disengaging device or shifter 1, wherein an antifriction bearing 2 having an inner bearing race 2a predisposed to co-rotate with the clutch disengaging means and an outer bearing race 2b that does not co-rotate with the disengaging means, is disposed so as to be radially movable relative to a support 3 formed of a cold-drawn guide sleeve 3a and a contact flange 3b. One side of the flange 3b is engaged by the clutch operating or actuating means and the other side thereof acts upon the non-revolving bearing race 2b so as to disengage or release the clutch thereby. The support 3 further includes an enclosure or sleeve 3c, which surrounds the outer bearing race 2b at a radial spacing therefrom and has a contact portion 3d which assumes the function of retaining the bearing 2 on the support 3. The bearing 2 has play in radial direction, the part 3b or portion 3d offering no resistance to the radial displacement of the bearing 2. The outer stationary bearing race 2b is formed, preferably in a front portion thereof, with a groove 4, wherein a bracing or holding member in the form of a waveshaped or corrugated ring or washer 5 is provided, which may be slit to facilitate the insertion thereof into the groove 4, and which is clamped in the axial direction through the bracing regions 4a and 4b formed in the walls of the groove. The corrugated washer 5 is enclosed at the radially outer region thereof by the sleeve 3c, and the radially inner region of the washer 5 has a larger diameter than the base of the groove 4, so that thereat the bearing 2 can be moved radially relative to the bracing means secured on the support 3 and is retained in this position after being centered on the axis of the clutch upon engagement and disengagement of the clutch, (which is a shift of the bearing 2 in radial direction) through the displacement resistance existing between the bracing means 5 and the groove 4.

In the embodiment of FIG. 2, the support 6 of the disengaging device 7 is formed of a guide or slide sleeve 6a and a radial flange 6b, which can again be acted upon by the clutch operating or actuating means, such as a disengaging fork. The bearing 8 is constructed in this emobidment in such a manner that the outer bearing race 8a is intended for co-rotation with the clutch disengaging means, while the inner bearing race 8b is stationary. The bearing 8 is again displaceable on all sides in radial direction relative to the support 6 and, in fact, against a displacement resistance which is formed by a corrugated or wave-shaped washer 9. The latter rests with its radially inner region on the guide or slide sleeve 6a and is clamped between bracing surfaces 10a and 10b, so as to be braced in axial direction, in a groove 10, the diameter of which is larger than the outside diameter of the washer 9. In order to secure the bearing 8 on the support 6, a snap ring 11, which serves as a stop for the corrugated washer 9, is provided in the guide or slide sleeve 6a.

FIG. 3 shows a disengaging device or shifter 12, having a support 13 formed of a sliding sleeve 13a and a flange 13b, on which a bearing 14 is radially movable; the bearing race intended for co-rotation with the clutch disengaging means being again the outer bearing race 14, and the inner bearing race 14b being stationary. The bearing 14 is movable, however, together with bracing means 15, a corrugated washer, in radial direction relative to the support 13. For this purpose, the bearing race 14b extends over the sliding sleeve 13a with radial spacing, and the corrugated washer 15 engages with the radially outer region thereof the radially inner surface of the bearing race 14b. In a groove 16, formed in the sliding sleeve 13a, the base of the groove 16 has a smaller diameter than that of the radially inner regions of the corrugated washer 15, and the corrugated washer 15 together with the bearing 14 can be moved in radial direction and centered and retained on the axis of rotation of the clutch, for which purpose the corrugated washer 15 is braced by the surfaces 16a and 16b in axial direction and the displacement resistance occurs. A guard or rataining ring 17 may be provided in the non-revolving inner race 14 and can thus retain the bearing 8 on the support 13.

In a further embodiment wherein a bearing 18 together with bracing means 19 can be moved in radial direction relative to a support 20 formed of a sliding sleeve 20a and a flange 20b, and wherein an inner race 18a of the bearing 18 is intended to co-rotate with the clutch disengaging means while a stationary outer race 18b is enveloped by the bracing means 19, is shown in the disengaging device or shifter of FIG. 4. The non-revolving outer race 18b is provided with a step-shaped profile 22 whereon the bracing means 19, in the form of a corrugated washer, is seated by a radially inner region thereof, the step serving simultaneously to secure the bearing 18. The support 20 also has a sleeve 20c, which extends over the outer bearing race 18b with radial spacing and which is further provided with a bead 20d which forms a groove 23, the base of which has a larger diameter than the outer diameter of the corrugated washer 19, and between the lateral walls 23a and 23b of which, the corrugated washer is braced in axial direction, whereby the displacement resistance is formed and the bearing 18 is held in this position after being centered on the axis of rotation of the clutch.

FIG. 5 shows another different embodiment of the invention, wherein the disengaging device or shifter 24 has, in the same amnner as FIG. 4, a ball bearing 25 displaceable in radial direction, with an inner bearing race 25a intended to co-rotate with the disengaging release means of the clutch and with a stationary outer bearing race 25b, and wherein a support 26 is formed of a sliding sleeve 26a and a flange 26b. A bracing element 27 is fixed in radial direction by an enclosure or sleeve 28 which extends with a region 28a thereof further over a ring 29, which can be a snap ring, for example, and which engages the non-revolving bearing race 25b, or rather, in a groove 25c formed in the latter, whereby the bearing 25 is secured or retained while simultaneously permitting a small amount of axial displacement. Neutral in axial direction i.e., without effective prestressing in axial direction between the bearing 25 and the support 26, the corrugated washer 27 is clamped with prestress and, in fact, between the region 26c of the flange 26b and the region 29a of the snap ring 29.

As aforementioned, the invention is not limited to the embodiments shown, but rather, instead of bracing means in the form of corrugated washers, cup or plate springs or similar elements may also be used. Bracing members of rubber or synthetic material can also be used, for example, instead of the part 27 in FIG. 5.

Without straying from the idea of the invention, it is further possible to brace, for example, two bracing elements against each other at one of the parts i.e., the support or the non-revolving bearing race, and to permit the bracing force formed thereby to be applied in common to the other element. In this connection, the bracing elements could be provided with a possibility of being displaceable with and/or relative to the bearing or the support in radial direction.

There are claimed:

1. Disengaging device for a clutch comprising support means, an antifriction bearing having one bearing race predisposed to act upon and co-rotate about a rotary axis with disengaging means of the clutch and another bearing race predisposed not to co-rotate with the clutch disengaging means and being actable upon by said support means through a contact surface so as to effect a disengaging movement, and means providing a resistance to displacement in radial direction effective between said support means and said antifriction bearing, said means providing a resistance to displacement comprising at least one annular holding member elastic in axial direction and disposed around the rotary axis, said holding member being formed of spring steel and being clamped, on one hand, by bracing profile means formed in one of said non-rotating bearing race and said support means so as to be braced directionally neutral in axial direction, said holding member effectively engaging, on the other hand, the other of said non-rotating bearing race and said support means, so as to hold said non-rotating bearing race and said support means in a respective relative radial position.

2. Disengaging device according to claim 1 wherein said holding member elastically braced in axial direction is simultaneously braced in radial direction against said other of said non-rotating bearing race and said support means and applies resistance against axial displacement.

3. Disengaging device according to claim 1 wherein said holding member is an annulus resilient simultaneously in axial and radial directions.

4. Disengaging device according to claim 1 wherein said holding member is formed of at least one part elastic in axial direction and at least one part elastic in radial direction.

5. Disengaging device according to claim 1 wherein said holding member and said bracing profile means are relatively displaceable in radial direction, said holding member in radial direction form-lockingly engaging said other of said non-rotating bearing race and said support means.

6. Disengaging device according to claim 5 wherein said form-locking engagement is effected by said holding member enclosing at least a portion of the periphery of said other of said non-rotating bearing race and said support means.

7. Disengaging device according to claim 5 wherein said form-locking engagement is effected by said holding member being enclosed by at least a portion of the periphery of said other of said non-rotating bearing race and said support means.

8. Disengaging device according to claim 1 wherein said non-rotating bearing race contains said profile means clamping said holding member neutrally as to direction, said profile means having a radial depth affording radial displacement of said antifriction bearing relative to said holding member and said support means, said holding member with regions projecting in radial direction from said profile means being in engagement with regions of said support means.

9. Disengaging device according to claim 8 wherein said non-rotating bearing race is the outer bearing race of said anti-friction bearing, and the radial depth of said profile means is greater than the radially inward extension of said holding member, said holding member having a radially outwardly extending portion disposed beyond the outer diameter of said outer bearing race and radially enclosed by an overlapping sleeve.

10. Disengaging device according to claim 8 wherein said non-rotating bearing race is the inner bearing race of said anti-friction bearing, and the radial depth of said profile means is greater than the radially outward extension of said holding member, a region of said holding member directed radially inwardly out of said profile means being in engagement with axially extending regions of said support means.

11. Disengaging device according to claim 1 wherein said profile means define a groove formed in said one of said non-rotating bearing race and said support means.

12. Disengaging device according to claim 1 wherein said anti-friction bearing together with said holding member is axially displaceable relative to said support means, and including stop means extending in radial direction on said support means for limiting axial displacement of said holding member.

13. Disengaging device according to claim 1 wherein said support means contain said profile means clamping said holding member neutrally as to direction, said profile means having a radial depth affording radial displacement of said holding member together with said antifriction bearing, said holding member having regions thereof projecting in radial direction out of said profile means and into engagement with said non-rotating bearing race.

14. Disengaging device according to claim 13 wherein said support means have a region thereof underlying said non-rotating bearing race in axial direction and radially spaced therefrom, said profile means being contained in said region of said support means.

15. Disengaging device according to claim 13 wherein said support means include an enclosure portion overlying the outer race of said antifriction bearing and extending in axial direction and radially spaced therefrom, said profile means being contained in said enclosure portion of said support means.

16. Disengaging device according to claim 13 wherein said anti-friction bearing is axially displaceable relative to said support means and said holding member, and including stop means extending in radial direction and effective between said non-rotating bearing race and said holding member for limiting axial displacement of said antifriction bearing.

* * * * *